United States Patent [19]
Klein

[11] Patent Number: 5,596,628
[45] Date of Patent: Jan. 21, 1997

[54] METHOD AND APPARATUS FOR INITIATING LOADING OF SOFTWARE IN A PERSONAL COMPUTER IN RESPONSE TO AN INCOMING SIGNAL

[76] Inventor: Jon Klein, 562 Military Way, Palo Alto, Calif. 94306

[21] Appl. No.: 635,228

[22] Filed: Apr. 12, 1996

Related U.S. Application Data

[63] Continuation of Ser. No. 194,171, Feb. 9, 1994, abandoned.

[51] Int. Cl.$^6$ ................................................ H04M 11/00
[52] U.S. Cl. .......................... 379/93; 379/102; 379/67; 395/750; 307/66
[58] Field of Search ..................................... 379/102, 105, 379/93–98, 100, 67, 88, 89; 395/750, 575; 307/66

[56] References Cited

U.S. PATENT DOCUMENTS

| | | | |
|---|---|---|---|
| 4,051,326 | 9/1977 | Badagnani et al. | 379/96 |
| 4,206,444 | 6/1980 | Ferlan | 379/102 |
| 4,656,318 | 4/1987 | Noyes | 379/93 |
| 4,701,946 | 10/1987 | Oliva et al. | 379/102 |
| 4,723,269 | 2/1988 | Summerlin | 379/102 |
| 4,821,312 | 4/1989 | Horton et al. | 379/104 |
| 4,907,254 | 3/1990 | Suzuki et al. | 379/102 |
| 4,922,450 | 5/1990 | Rose | 364/900 |
| 4,996,706 | 2/1991 | Cho | 379/93 |
| 4,998,273 | 3/1991 | Nichols | 379/102 |
| 5,003,578 | 3/1991 | Lin | 379/90 |
| 5,051,720 | 9/1991 | Kittirutsunetorn | 340/310 |
| 5,065,427 | 11/1991 | Godbole | 379/100 |
| 5,191,323 | 3/1993 | Abbes | 340/825.37 |
| 5,198,806 | 3/1993 | Lord | 379/102 |
| 5,361,296 | 11/1994 | Reyes et al. | 379/96 |
| 5,410,713 | 4/1995 | White et al. | 379/102 |

FOREIGN PATENT DOCUMENTS

| | | | |
|---|---|---|---|
| 58-15356 | 1/1983 | Japan | 379/93 |
| 60-80355 | 5/1985 | Japan | 379/94 |
| 2191066 | 12/1987 | United Kingdom | 379/70 |
| WO9310615 | 5/1993 | WIPO . | |

OTHER PUBLICATIONS

XPECT Trading Corporation advertisement in Jan. 1994 issue of Computer Shopper.
Server Technology Product Information, P.C. Magazine, Jun. 1993.
Server Technology Product Announcement, Jul. 26, 1993 issue of Infoworld, p. 46.
Technology Concepts Inc. Product Information, ©1990.
Speaking Devices Corporation Product Information ©1993.

*Primary Examiner*—Wing F. Chan
*Attorney, Agent, or Firm*—Townsend and Townsend and Crew LLP; Joseph M. Villeneuve

[57] ABSTRACT

A method and apparatus for supplying power to a computer, and initiating loading of software in the computer in response to a first signal. The invention allows a fax to be received, or a modem session initiated by a computer while the computer is unattended and powered down. The invention initiates the loading of the appropriate software in the computer for conducting the incoming session. The invention also directs incoming calls so that only one phone line is required for voice, fax, and modem sessions.

20 Claims, 5 Drawing Sheets programmable time period (TDLY5) of silence is detected on the line. After another programmable time period (TDLY1), device 10 transmits a fax keystroke sequence to computer 12. Computer 12 then loads its fax software and fax reception either begins immediately, or immediately upon reception of the next call. Such a second call may be necessary in some circumstances because the transmitting fax machine may not tolerate the delay necessary to load the host software.

Device 10 may be programmed to inhibit the ring on all calls to the answering machine during the time that computer 12 is powered up to avoid conflicts between the answering machine and fax or modem reception software (INHA).

If one of three dual-tone multi-frequency (DTMF) sequences is detected device 10 takes one of the following courses of action.

If the DTFAX sequence is detected, device 10 powers on computer 12 and simulates "hang-up" to answering machine 28. Device 10 then releases phone line 26 to prepare for the next incoming call after a programmable time period (TDLY5) of silence is detected on the line. After another programmable time period (TDLY1), device 10 transmits a fax keystroke sequence (KEYFAX) to computer 12 which, in response, loads its fax receive software. Fax reception either begins immediately or on the next call. As described above, device 10 may be programmed to inhibit the ring on all calls to the answering machine during the time that computer 12 is powered up, thereby avoiding conflicts between the answering machine and the fax or modem reception software.

If the DTMOD sequence is detected, the same steps occur except that device 10 transmits a sequence of keystrokes (KEYMOD) to computer 12, in response to which computer 12 loads its modem session software. Likewise, if the DTMAN sequence is detected, the same steps occur except that device 10 transmits a sequence of keystrokes (KEYMAN) to computer 12 which initiates the loading of any desired software for a manual session.

If the DTRST sequence is detected and computer 12 is powered on, device 10 will remove power from computer 12 and return all of its internal timers to the state in which it is waiting for a new call. After the DTRST sequence is received, device 10 will wait for further instructions (e.g., new CNG or DTMF tone sequence) for (TDLY5) a programmable period of time before releasing phone line 26.

In Auto-Answer mode, device 10 supplies power to computer 12 upon detection of an incoming call, i.e., ring detect, and goes "off-hook" after a programmable number of rings. Device 10 then monitors phone line 26 for either a CNG or a DTMF tone sequence to determine which session software to command computer 12 to load once the boot routine is complete. Device 10 then transmits the appropriate keystroke sequence to computer 12 after a programmable delay period (TDLY1), the length of which is determined by the duration of the boot routine. The RAM test which is normally part of the boot-up routine may be bypassed if device 10 transmits an ESC key code. Device 10 may be programmed to transmit the ESC code after a programmable delay (T_ESC). If neither a CNG or a DTMF tone sequence is detected within a programmable time period (TDLY3), a keystroke sequence (KEYMAN) is transmitted to computer 12 after a different programmable delay CFDLY1) to initiate loading of some other desired software for a manual session. Any time that computer 12 is powered up, any new incoming calls will be auto-answered only after 10 rings, as these incoming calls would normally be answered by the fax/modem software after only a couple of rings.

In all operational modes and for all software session types, power is removed from computer 12 after a programmable delay period (TDLY2) following the termination of the call.

Device 10 has a "fax waiting" LED (not shown) which flashes to indicate that a fax session has been initiated. The LED will be reset by a manual power-on. An "AC on" LED comes on whenever the AC power is applied to the computer. A "ready" LED also comes on when power is applied to device 10 to indicate that it is operational.

Manual power-on of the computer is accomplished by means of a manual switch (see FIG. 3) which will cause device 10 to power on computer 12 and reset the "fax waiting" LED. While computer 12 is manually powered on, device 10 will leave phone line 26 connected to answering machine 28, and will transmit the ESC key code (if enabled) after a programmable delay (T_ESC) and the KEYMAN keystroke sequence after another programmable delay (TDLY1). In this mode, device 10 will not react to any phone line activity.

In one embodiment, the programming mode is entered via a programming mode switch (see FIG. 3) located on device 10. This puts device 10 into a mode whereby keyboard 20 may be used to set the programmable parameters of device 10 as discussed above. These constants are stored in a non-volatile memory inside the device 10. Table 1 contains the parameters of a particular embodiment of the invention which are programmable by the user. The table lists the symbols by which the parameters are known, a brief description of each parameter, and the default value and acceptable range of programmable values for each parameter. Programming mode may be initiated without a programming mode switch through a variety of other means, including, but not limited to software commands, or signals from keyboard 20 to the computer.

FIG. 2 is an internal block diagram of one embodiment of device 10. A power relay 50 is connected in series with the AC power line and is coupled to and controlled by microcontroller 52. Keyboard input 22 provides input from keyboard 20 to microcontroller 52, and keystroke codes are transmitted to computer 12 from microcontroller 52 via keyboard output 24. Relay 54 is connected between phone input 30 and phone output 32 and is also coupled to and controlled by microcontroller 52. Memory 56 is coupled to microcontroller 52 and provides storage for, among other things, the programmable constants referred to above. Alternatively, memory 56 may comprise a non-volatile memory in which the programmable parameters discussed above are not user programmable, but are set to various default values. Phone input 30 is also coupled to tone detection circuitry which includes dam access arrangement (DAA) interface 58 and tone detectors 60. DAA interface 58 is the analog interface between the incoming phone line and tone detectors 60 for extracting the necessary audio information from the phone line.

It will be understood that many alternatives to microcontroller 52 may be employed without departing from the scope of the present invention. Virtually any control logic device or circuitry which performs the functions described above with reference to microcontroller 52 is within the scope of the invention. For example, various types of discrete and integrated control logic, including programmable logic devices may be used.

FIG. 3 is another internal block diagram of device 10 which shows the connections between various internal subsystems. Digital controller 70, which contains microcontroller 52 and memory 56 receives 5 VDC from DC power supply 72. DC power supply 72 is a linear supply which provides 5 VDC for the signal level components and an unregulated 12 VDC (not shown) for the relays. Digital controller card 70 is also connected to analog and AC power subsystem 74 by means of various control and data lines as shown. The series of LEDs described above are coupled to digital controller card 70 and controlled by microcontroller 52. These are "AC on" LED 76, "fax waiting" LED 78, and "ready" LED 80. The various switches described above are also coupled to digital controller card 70 and controlled by microcontroller 52. These are manual switch 82 for manually providing power to the computer; programming mode switch 84 for placing device 10 in programming mode; and Auto-answer switch 86 for placing device 10 in Auto-answer mode.

FIG. 4 is a block diagram of analog and power subsystem 74. Analog subsystem 74 includes power relay 50 which is coupled to microcontroller 52 by means of relay driver 77; phone relay 54 which is coupled to microcontroller 52 by means of relay driver 79; tone detection circuitry which includes DAA interface 58, CNG tone detector 60a, and DTMF tone detector 60b.

Device 10 is programmed through keyboard 20 with the initial settings being displayed on the screen (not shown) of computer 12 using a software program which echoes the keystrokes received by computer 12. The user loads the software program and places device 10 in programming mode via a switch on device 10. Device 10 delivers a sign-on message to the screen of computer 12 and the default initial settings are displayed on the screen. The character for a particular setting indicates whether that setting should remain unchanged. As discussed above, device 10 may be placed in programming mode in a variety of ways. The programming of the operational parameters may also be achieved in a variety of ways without departing from the scope of the invention.

In addition to the programmability of the various parameters discussed above, there are several different possibilities for an AUTOEXEC routine to run with the present invention. The best alternative is to run a very short AUTOEXEC which can load very quickly and be prepared for device 10 to type in the keystrokes for a modem, a fax, or a manual session which would lead to one of three different .BAT programs which would load the required software, or, alternatively, the remainder of a longer AUTOEXEC.BAT routine. Another possibility is to use a branching AUTOEXEC program which is keyed to go to a location which is determined by the keyboard response to the prompt issued by the branching AUTOEXEC. Programs such as "ask" or "choose" can be used in the AUTOEXEC to effect the branch. If a fast power-up routine and the Esc key feature are used in conjunction with fast-loading DOS-based fax receive software, it is conceivable that the fax session could be completed with no call-back by the sending fax required.

The above-described embodiment of the present invention solves the problems presented in the Background of the Invention with a low implementation cost and simple-installation. Furthermore, this embodiment may be used with any computer and fax/modem, including systems having internal fax/modem cards.

FIG. 5 is a block diagram of a system incorporating a power control and call direction device 100 according to another embodiment of the present invention. This embodiment incorporates a fax/modem and data storage which allows the reception of data while computer 102 is powering up and loading the appropriate session software. A description of the operation of device 100 is presented below with reference to an incoming facsimile.

Device 100 powers computer 102 on when an incoming fax tone is detected. Device 100 then conducts a fax reception session with the remote fax transmitter and buffers the received dam. Device 100 also responds to interrogation from computer 102, and, in conjunction with the power-up software of computer 102, loads the appropriate fax session software. Once the fax software is loaded, device 100 emulates an incoming fax session initiation to computer 102. As described with reference to device 10, various parameters of device 100 may be programmed by the user.

A fax session as described is handled by device 100 according to the CCITT (International Telegraph and Telephone Consultative Committee) fax handshake protocol. An internal microcontroller handles the protocol. Data is stored in internal RAM. When a CNG or DTMF tone sequence is detected, device 100 immediately powers on computer 102. The fax/modem software in computer 102 initiates signals through a COM port 104 (shown as an RS232 interface) to set up the modem in device 100 for reception. After receiving these signals from the computer 102, device 100 sends ring detection bytes to computer 102 and imitates the fax modem session to the fax receiving software. Device 100 then conducts a fax session with the fax receive software and transmits the data to computer 102 on a FIFO basis.

Upon detection of a DTMF sequence (programmed by user), device 100 powers on computer 102 and initiates loading of the modem session software. After device 100 receives the modem software's initiation string, it simulates ring detection to the host (if the caller is still on the line). If the caller has "hung up" device 100 will await a new call.

In both of the above-described cases, device 100 instructs software in the computer's AUTOEXEC.BAT to branch to fax receive software load, modem software load, or normal boot via interrogation and handshaking on the COM port. Device 100 turns the power to computer 102 off if no phone line activity is detected for a programmable time delay. In all cases, device 100 does not answer the phone, but monitors the phone line for CNG or DTMF tone sequences while the answering machine plays the Outgoing Message (OGM). If a voice call is received, device 100 does nothing.

FIG. 6 is a portion of an internal block diagram of device 100. The fax/modem comprises dam pump 106, in combination with DAA 108 and microcontroller 110. Data pump 106 performs the modulation/demodulation function, converting the incoming tone sequences to digital data which can be processed by microcontroller 110.

FIG. 7 is a block diagram of a system incorporating a power control and call direction device 120 according to still another embodiment of the present invention. Device 120 is similar to device 100 except that device 120 does not contain a fax/modem portion. Instead, device 120 works with the user's external fax/modem. Device 120 performs all the same functions as device 100 as described above, but is positioned between fax/modem 124 and computer 122 via RS232 connections 126 and 128. When not performing the "unattended" fax receive, device 120 simply passes serial data through undisturbed between computer 122 and external fax/modem 124. The advantage of this implementation is that it allows the user to exercise his own preference in choosing the cost and performance level of the external fax/modem.

It will be understood that devices designed according to the present invention may communicate with the host com-

METHOD AND APPARATUS FOR INITIATING LOADING OF SOFTWARE IN A PERSONAL COMPUTER IN RESPONSE TO AN INCOMING SIGNAL

This is a continuation of application Ser. No. 08/194,171, filed Feb. 9, 1994, now abandoned.

BACKGROUND OF THE INVENTION

The present invention relates to a method and apparatus for initiating loading of software in and providing power to a computer system in response to an incoming signal. More specifically, the present invention provides a method and apparatus by which a computer may be powered on in response to a facsimile or modem session tone sequence received over a phone line. The invention also has the capability of initiating the loading of the appropriate software package in the computer necessary to conduct the session.

In the past, to receive a facsimile (fax) or initiate a remote session with a personal computer (PC), the user was required to leave his computer on resulting in wasted energy and wear and tear on the computer. This was especially true with regard to moving parts such as those in, for example, a hard disk drive. One alternative has been for the user to turn on the PC in anticipation of receiving a fax. However, this is not always logistically possible.

Other difficulties have been encountered in previous systems. Operationally, fax software and modem software are usually quite different and mutually exclusive. For example, one of the most popular programs for communications and file transfer with a desktop PC from a remote portable PC is LapLink. However, LapLink does not receive faxes automatically. In fact, if LapLink is active and a fax call comes in, the PC will not respond appropriately. Likewise, if a fax reception program, e.g., WinFax, is loaded and ready, and a modem session is required, there is no convenient way to unload the fax software remotely to initiate the modem session. While some software packages exist which integrate fax and modem capabilities, design trade-offs inevitably degrade performance.

Previous systems also have required additional, dedicated phone lines for PCs with fax and modem capabilities to avoid interference with incoming voice transmissions.

Because for most personal computer users fax reception occurs only occasionally, an apparatus is desired by which a fax may be received, or a modem session initiated while the PC is unattended and powered down. Furthermore, it is desirable that such an apparatus be capable of initiating the loading of the appropriate software package for conducting the incoming session. Finally, the apparatus should be capable of directing incoming calls so that only one phone line is required for voice, fax, and modem sessions.

Several attempts have been made to address the problems described above. For example, the Telepower™ from Speaking Devices Corporation is a remote controlled power switch which applies AC power by means of a relay to, for example, a computer or fax machine upon detection of the ring signal on the phone line. The Telepower™ removes power five minutes after the end of a communication.

Server Technology's Remote Power On/Off™ performs a similar function, detecting ring sequences on the telephone line to turn AC power on or off, but adds a feature which switches the telephone signal to either a fax machine or modem by means of relays in response to the number of rings before the caller hangs up. The Remote Power On/Off™ also features a reboot mode which is based on ring detection and counting.

The Sentry Remote Power Manager from Server Technology also allows remote control of power to a plurality of devices, such as PCs or a file servers. The Sentry is connected between a telephone jack and a modem. The Sentry detects incoming phone calls and uses the modem to communicate with a calling PC. The user of the calling PC then commands the Sentry to control individual power modules which each supply power to one of the plurality of devices. This enables the user to reboot a locked up server, for example, remotely.

The Automatic Switching and Processing Ring Decipher 4000 (RD4000) from Command Communications directs incoming calls in combination with the "Distinctive Ringing" service offered by many telephone companies. This service assigns multiple numbers to individual phone lines, each with a distinctive ring. The RD4000 deciphers the ring and directs the call to the appropriate communication device, e.g., fax machine, or PC. Similarly, the Fax Line Manager from Technology Concepts, Inc., answers an incoming call and directs the call to the appropriate communication device after determining the type of call (i.e., voice, fax, modem) by detecting the incoming signal code. Both of these devices physically multiplex the incoming signal to one of a plurality of communication devices connected thereto.

None of these solutions directs incoming calls in the manner of the present invention. Furthermore, none of these solutions presents a means by which a user may load a software package on the remote computer appropriate to the incoming call. Finally, none of these solutions provides these capabilities in combination with the ability to supply power to the remote computer, or alternatively to "wake up" the remote computer from a standby mode. The present invention provides such an integrated solution. Different embodiments of the invention provide these solutions with varying degrees of convenience and cost.

SUMMARY OF THE INVENTION

According to the present invention, a method and apparatus for supplying power to a computer, and initiating loading of software in the computer in response to a first signal is provided. The present invention allows a fax to be received, or a modem session initiated by a computer while the computer is unattended and powered down. The invention initiates the loading of the appropriate software package in the computer for conducting the incoming session. The invention also directs incoming calls via software commands and handshake protocols so that only one phone line is required for voice, fax, and modem sessions.

In a specific embodiment of the present invention, an apparatus is provided in which a phone line interface for receiving a first signal is included. Tone detection circuitry is coupled to the phone line interface for detecting the first signal. Control logic and an associated memory are coupled to the tone detection circuitry. A computer interface is coupled to the control logic for transmitting commands to the computer from the control logic. The commands are for initiating loading of software which corresponds to the first signal. In a more specific embodiment, a power switch for supplying power to the computer is coupled to and controlled by the control logic. In a further embodiment, the control logic comprises a microcontroller.

In one embodiment, the phone line interface includes a phone relay by which the apparatus may simulate a line disconnection to a phone answering machine, and/or a dam access arrangement (DAA) interface. In another embodiment, the tone detection circuitry includes a CNG tone decoder and a DTMF tone decoder.

In one embodiment, the computer interface includes a keyboard input and a keyboard output coupled to the control logic. The keyboard input is for receiving signals from the computer's keyboard, and the keyboard output is for transmitting signals to the computer. In another embodiment, the control logic is programmable with regard to a number of parameters which facilitate the loading of the software.

In one embodiment of the invention, the apparatus includes a data buffer coupled to the phone line interface for temporarily storing data received via the phone line interface. In another embodiment, the apparatus also includes a fax/modem in addition to the data buffer. In a more specific embodiment, the computer interface is an RS232 bus.

As indicated above, a method for supplying power to a computer, and initiating loading of software in the computer in response to a first signal is also provided. A phone line is monitored and a first signal is detected on the phone line. The first signal is analyzed to determine which software package should be loaded in the computer. First commands are then transmitted to the computer to initiate loading of the appropriate software in the computer. In a more specific embodiment, the first signal is also analyzed to determine if power should be supplied to the computer. Power is then supplied to the computer in response to this second analyzing step. In a different specific embodiment, the first signal is analyzed to determine if second commands should be sent to the computer to awaken the computer from a standby mode. Second commands are then transmitted to the computer to awaken it from the standby mode in response to this second analyzing step.

In one embodiment, the method of the invention includes the step of programming control logic to control the number of rings before the line is answered, the time interval after the last computer activity to remove power from the computer, and the delay after interrogation by the computer to begin a facsimile session handshake protocol.

In another embodiment, the first signal indicates an incoming facsimile, and the software is a facsimile application software. According to this embodiment, a facsimile reception session is conducted external to the computer. Data corresponding to the incoming facsimile are then buffered. An incoming facsimile session initiation is then emulated to said facsimile application software in the computer. Finally, the data are loaded into the computer. In a different embodiment, the first signal is a DTMF sequence, and the software is a modem session software.

A further understanding of the nature and advantages of the present invention may be realized by reference to the remaining portions of the specification and the drawings.

DESCRIPTION OF SPECIFIC EMBODIMENTS

Figure 1:
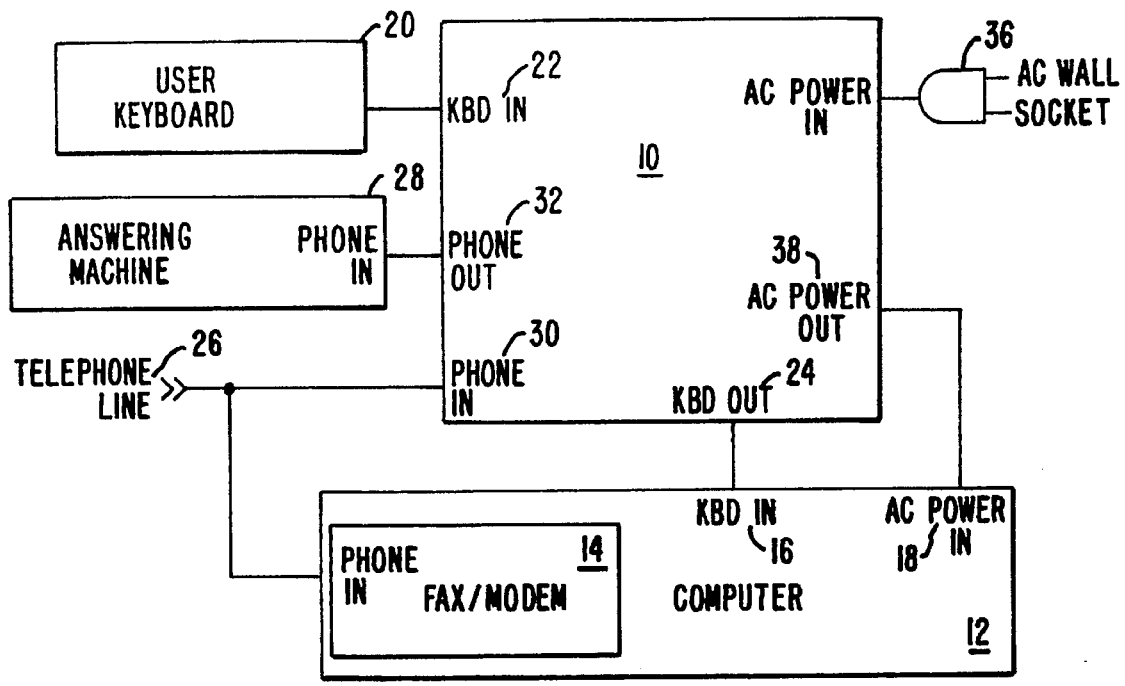
FIG. 1 is a block diagram of a system incorporating one embodiment of the present invention.
Figure 2:
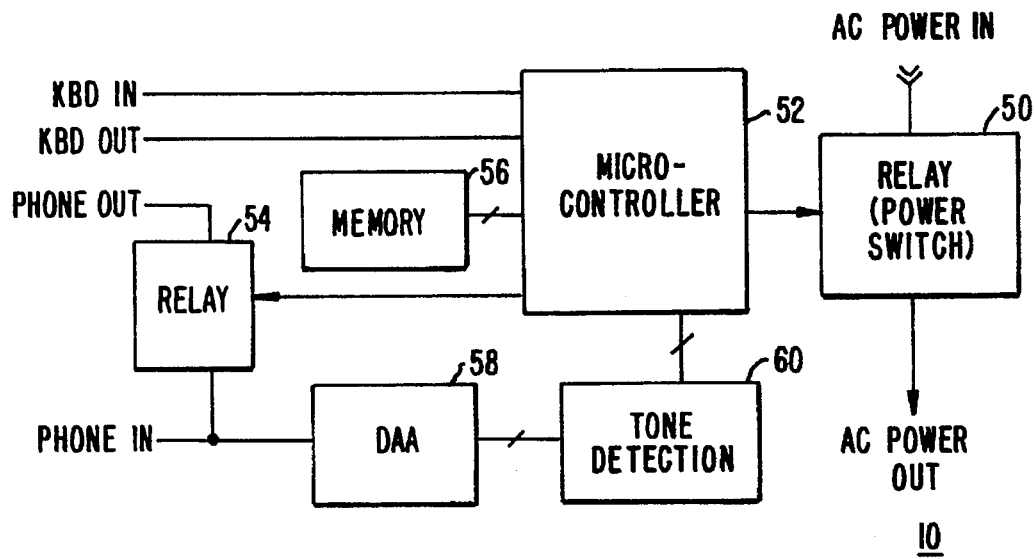
FIG. 2 is an internal block diagram of a specific embodiment of the present invention.
Figure 3:
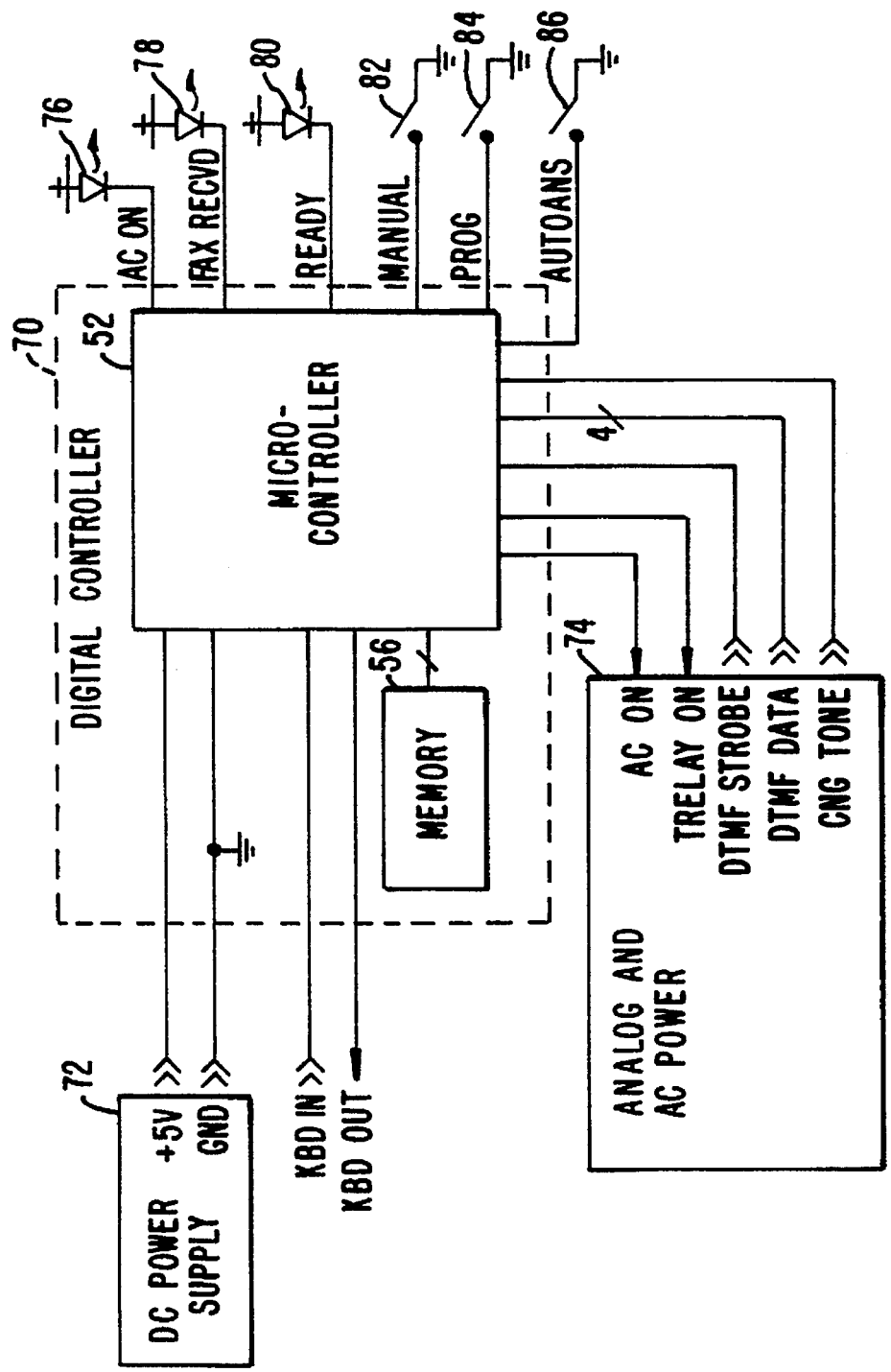
FIG. 3 is an internal block diagram of a specific embodiment of the present invention.
Figure 4:
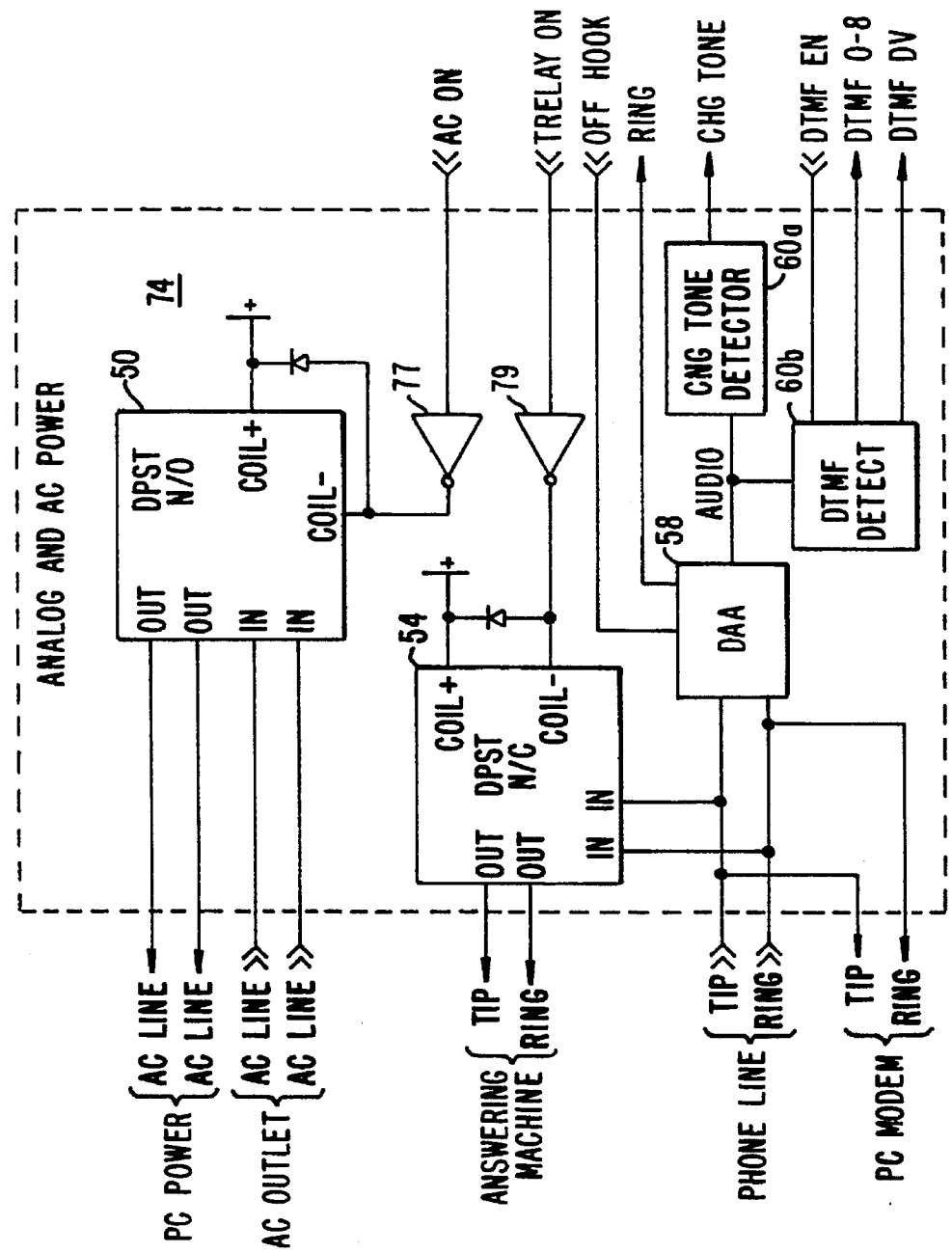
FIG. 4 is a block diagram of an analog and AC power board employed in a specific embodiment of the present invention.
Figure 5:
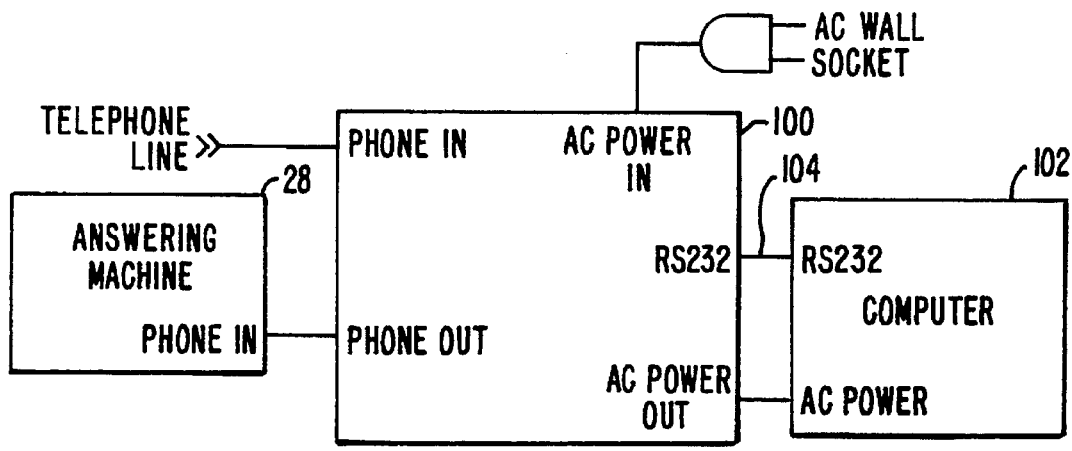
FIG. 5 is a block diagram of a system incorporating a second embodiment of the present invention.
Figure 6:
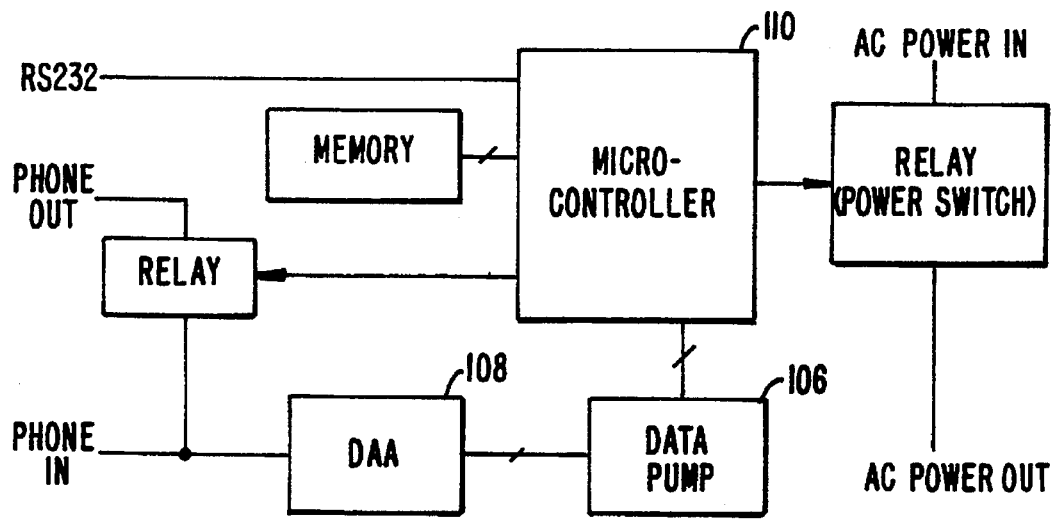
FIG. 6 is an internal block diagram of a specific embodiment of the present invention.
Figure 7:
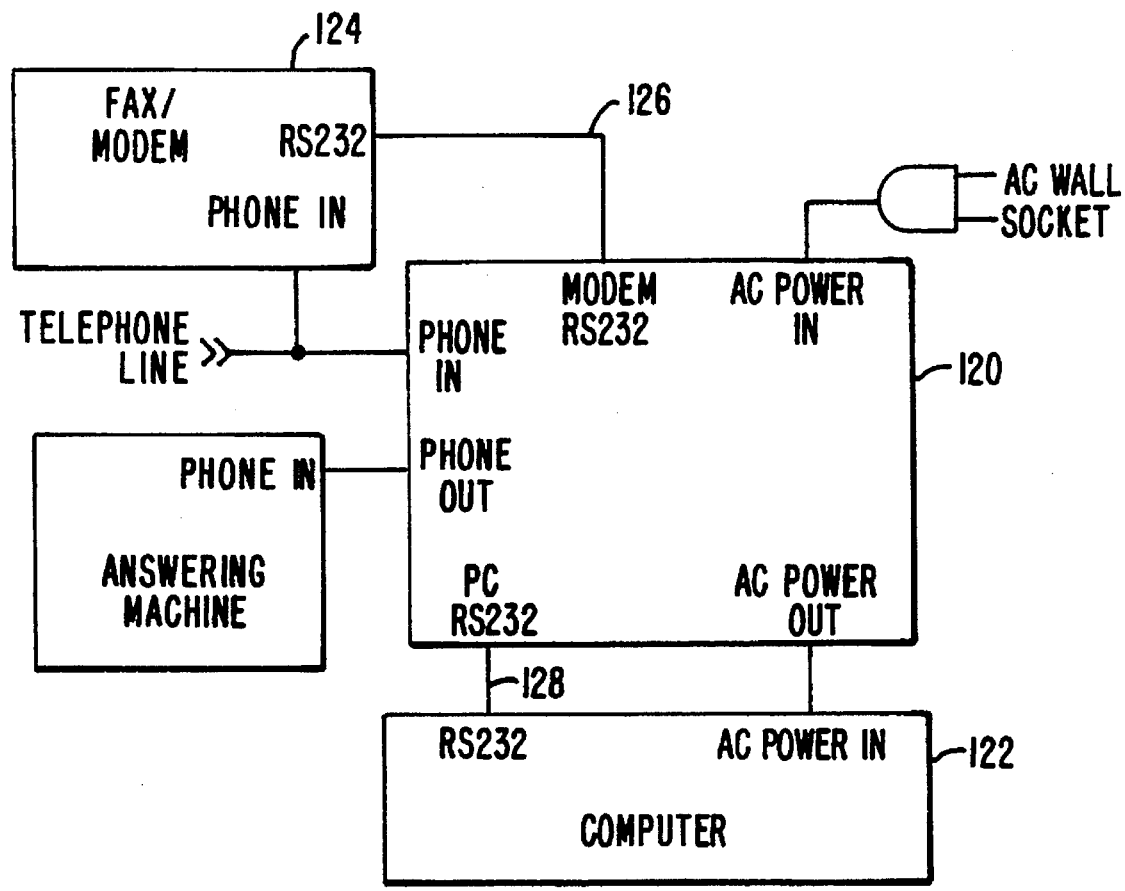
FIG. 7 is a block diagram of a system incorporating a third embodiment of the present invention.

FIG. 1 is a block diagram of a computer system incorporating a power control and call direction device 10 designed according to one embodiment of the present invention. The system includes a computer 12 having a fax/modem 14, a keyboard input 16, and an alternating current (AC) power input 18. Device 10 is connected between computer 12 and keyboard 20 via keyboard input 22 and keyboard output 24. Device 10 is also connected between incoming telephone line 26 and answering machine 28 via phone input 30 and phone output 32. Finally, device 10 is connected between an AC power source (not shown) and the AC power input 18 of computer 12 via AC wall socket plug 36 and AC power output 38. The embodiment of the invention shown may also be used in computer systems employing external fax/modems.

Device 10 powers computer 12 on when an incoming fax or DTMF tone is detected. Device 10 then "types in" commands through the keyboard input of computer 12 to load the appropriate application software after a programmable power-up delay time. Programming of the invention's operational parameters is done in a programming mode via keyboard 20. It will be understood that programming of device parameters may be accomplished in a variety of other ways without departing from the scope of the invention. For example, in one embodiment, rather than having a programmable delay before keystroke codes are transmitted, a software driver may be employed. For example, computer 12 could send a BIOS reset signal to device 10 via the bidirectional keyboard port, after which device 10 awaits a ready signal from computer 12 before transmitting any keystrokes. Such a ready signal could be transmitted by computer 12 as a result of, for example, the execution of a software routine initiated by the AUTOEXEC.

The invention also allows external answering machine 28 to handle voice (non-data) calls, therefore allowing for single-line installations.

Device 10 operates in one of two modes, Normal mode, or Auto-Answer mode. Normal mode is intended for use with a single telephone line installation having an answering machine where most incoming calls are voice messages. Auto-Answer mode is intended for installations where the phone line is not used with an answering machine.

In Normal mode, a ting is detected by answering machine 28 at which time answering machine 28 goes "off-hook". Device 10 is in listen mode (unless set to Auto-Answer mode). Answering machine 28 plays its outgoing message (OGM). If neither a fax tone or a valid DTMF sequence is detected, device 10 does nothing. Answering machine 28 records any voice message and the call is then terminated by answering machine 28. The user must program the DTMF sequences of device 10 so as not to interfere with remote answering machine operation, which is typically controlled by its own DTMF sequences.

If a fax (CNG) tone sequence is detected, device 10 goes "off-hook" to supply power to computer 12 and simulates a "hang-up" to answering machine 28. Device 10 releases phone line 26 to prepare for the next incoming call after a puter in a variety of ways. The abovedescribed embodiments communicate with their respective computers via keyboard ports and RS232 interfaces. However, a variety of other interfaces, including various types of COM ports, serial ports, and parallel ports, may be employed without departing from the scope of the invention.

It will also be understood that the present invention may be employed with a wide variety of computers, and specifically with IBM compatible personal computers and Apple Macintosh computers. When employed with a Macintosh system, the operation of the invention may be simplified because of the software controlled shutdown mode of the Macintosh. This mode is often used by Macintosh users to shut down their systems rather than physically removing the AC power. Shutdown mode is a low power consuming standby mode in which the computer waits for a command from the keyboard to boot-up the system. In such a case, the present invention merely has to send signals through the keyboard port to "power up" the system in the event that an incoming session is detected.

While the invention has been particularly shown and described with reference to specific embodiments thereof, it will be understood by those skilled in the art that the foregoing and other changes in the form and details may be made therein without departing from the spirit or scope of the invention.

TABLE 1

| Symbol | Description/Usage | Default | Range |
|---|---|---|---|
| | User programmable parameters. | | |
| | Time Delays | | |
| TDLY1 | Time from PC power on to start key stroke sequence. | 30 sec | 0–2550 sec |
| TDLY2 | Time from PC power on to PC power off after call termination. This timer is continually reset when activity is detected on the line. | 5 min | 1–256 min |
| TDLY3 | Seconds of total off hook time before hanging up while waiting for tones in auto-answer mode. | 30 sec | 1–256 sec |
| TDLY5 | Time after receiving DTMF sequence or fax tone that PM3 will hold the line before releasing after line silence. | 10 sec | 1 to 16 sec |
| T_ESC | Number of Seconds after power on to PC that PM3 will transmit the Esc Key code to bypass boot-up ram test. If 0, the Esc key will not be transmitted after power up. | 0 | 0 to 255 sec |
| | RINGS | | |
| RING1 | Number of rings before pick-up in auto-answer mode. If 0, unit is in normal mode and auto-answer is inhibited. | 1 | 1 to 16 |
| | DTMF Sequences | | |
| DTFAX | Sequence (4 to 8 numbers) to initiate fax session. | 1234 | |
| DTMOD | Sequence (4 to 8 numbers) to initiate modem session. | 5678 | |
| DTMAN | Sequence (4 to 8 numbers) to initiate manual session. | 2468 | |
| DTRST | Sequence (4 to 8 numbers) to power off PC. | 3579 | |

TABLE 1-continued

| Symbol | Description/Usage | Default | Range |
|---|---|---|---|
| | User programmable parameters. | | |
| | Key Stroke Sequences | | |
| KEYFAX | Command to PC to load Fax receive software. | 1(CR) | fixed |
| KEYMOD | Command to PC to load Modem session software. | 2(CR) | fixed |
| KEYMAN | Command to PC to load other session software Modes | 3(CR) | fixed |
| INHA | Inhibit operation of answering machine while PC is powered up. | 1 | 1 to 0 |

What is claimed is:

1. An apparatus for initiating loading of software in a single computer, the apparatus comprising:

a phone line interface for receiving a first signal over a phone line;

tone detection circuitry coupled to the phone line interface for determining whether the first signal comprises one of a plurality of different specific tone sequences;

control logic coupled to the tone detection circuitry for generating commands when the first signal comprises one of the specific tone sequences;

a power switch coupled to and controlled by the control logic for supplying power to the computer when the first signal comprises one of the specific tone sequences; and a computer interface coupled to the control logic for transmitting the commands to the computer from the control logic, the commands for initiating loading of software corresponding to a particular one of the specific tone sequences, each of the specific tone sequences having different software corresponding thereto;

wherein the phone line interface is operable to release the phone line after the computer interface initiates loading of the software to prepare for a subsequent incoming call, the subsequent incoming call being related to detection of the first signal.

2. The apparatus of claim 1 wherein the control logic is programmable with regard to a plurality of operational parameters of the apparatus which facilitate the loading of the software.

3. The apparatus of claim 1 wherein the control logic comprises a microcontroller.

4. The apparatus of claim 1 wherein the phone line interface comprises a phone relay by which the apparatus may simulate a line disconnection to a phone answering machine.

5. The apparatus of claim 1 wherein the tone detection circuitry comprises a CNG tone decoder and a DTMF tone decoder.

6. The apparatus of claim 1 wherein the computer includes a keyboard, and the computer interface comprises a keyboard input and a keyboard output coupled to the control logic, the keyboard input for receiving signals from the keyboard, and the keyboard output for transmitting the commands to the computer.

7. The apparatus of claim 1, further comprising a data buffer coupled to the phone line interface for temporarily storing data received via the phone line interface.

8. The apparatus of claim 1, further comprising:

a fax/modem; and a data buffer coupled to the phone line interface for temporarily storing data received via the phone line interface.

9. The apparatus of claim 1 wherein the computer interface comprises an RS232 bus.

10. A method for initiating loading of software in a single computer, the method comprising the steps of:

monitoring a phone line;

detecting a first signal on the phone line;

determining whether the first signal comprises one of a plurality of different specific tone sequences;

supplying power to the computer when the first signal comprises one of the specific tone sequences;

directing the computer to initiate loading of software corresponding to particular one of the specific tone sequences when the first signal comprises one of the specific tone sequences, each of the specific tone sequences having different software corresponding thereto; and releasing the phone line to prepare for a subsequent incoming call, the subsequent incoming call being related to detection of the first signal.

11. The method of claim 10 further comprising the step of:

directing the computer to awaken from a standby mode when the first signal comprises one of the specific tone sequences.

12. The method of claim 10 wherein the first signal indicates an incoming facsimile, and the software comprises facsimile application software, the method further comprising the steps of:

conducting a facsimile reception session external to the computer;

buffering data corresponding to the incoming facsimile;

emulating an incoming facsimile session initiation to the facsimile application software in the computer; and loading the data into the computer.

13. The method of claim 10 wherein the first signal comprises a DTMF sequence, and the software comprises modem session software.

14. The method of claim 10 further comprising the step of programming control logic for a plurality of parameters to facilitate the loading of the software.

15. The method of claim 14 wherein the step of programming the control logic comprises programming the control logic to delay a first number of rings before establishing a connection to the phone line.

16. The method of claim 14 wherein the step of programming the control logic comprises programming the control logic to delay a first time period following termination of a call before removing power from the computer.

17. The method of claim 14 wherein the step of programming the control logic comprises programming the control logic to delay a first time period following supplying power to the computer before transmitting commands to the computer.

18. The method of claim 14 wherein the step of programming the control logic comprises programming the control logic to listen for tone sequences for a first time period following reception of a call.

19. The method of claim 14 wherein the step of programming the control logic comprises programming the control logic to delay a first time period following reception of a DTMF tone sequence before terminating connection to the phone line.

20. The method of claim 14 wherein the step of programming the control logic further comprises programming the control logic to:

recognize a first sequence of tones before commanding initiation of a facsimile session;

recognize a second sequence of tones before commanding initiation of a modem session;

recognizing a third sequence of tones before commanding initiation of a manual session; and recognize a fourth sequence of tones before commanding a reset of the computer.

* * * * *